(12) United States Patent
Nganrungruang et al.

(10) Patent No.: US 11,197,266 B1
(45) Date of Patent: Dec. 7, 2021

(54) TELECOMMUNICATIONS NETWORK COVERAGE

(71) Applicant: T-Mobile USA, Inc., Bellevue, WA (US)

(72) Inventors: Piradee Nganrungruang, Renton, WA (US); Ting Zhang, Bellevue, WA (US); Anastasios Kostopoulos, Bellevue, WA (US); Raymond Wu, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 16/918,398

(22) Filed: Jul. 1, 2020

(51) Int. Cl.
*H04W 24/10* (2009.01)
*H04W 68/00* (2009.01)
*H04W 76/28* (2018.01)
*H04L 1/18* (2006.01)
*H04W 72/04* (2009.01)
*H04L 1/00* (2006.01)

(52) U.S. Cl.
CPC ......... *H04W 68/005* (2013.01); *H04L 1/0008* (2013.01); *H04L 1/189* (2013.01); *H04W 24/10* (2013.01); *H04W 72/0473* (2013.01); *H04W 76/28* (2018.02)

(58) Field of Classification Search
CPC ............... H04W 68/005; H04W 24/10; H04W 72/0473; H04W 76/28; H04L 1/0008; H04L 1/189
See application file for complete search history.

(56) References Cited

U.S. PATENT DOCUMENTS

| | | | |
|---|---|---|---|
| 8,811,977 B2 | 8/2014 | Austin et al. | |
| 8,964,582 B2 | 2/2015 | Wilkinson | |
| 9,113,345 B2 | 8/2015 | Griff et al. | |
| 10,397,043 B2 | 8/2019 | Tapia et al. | |
| 2012/0071157 A1 | 3/2012 | Markoulidakis | |
| 2015/0163831 A1* | 6/2015 | Wang | H04W 4/70 370/329 |
| 2016/0242116 A1* | 8/2016 | Masuda | H04W 52/0216 |
| 2018/0027593 A1* | 1/2018 | Lee | H04L 5/003 370/329 |

* cited by examiner

*Primary Examiner* — Chuong A Ngo
(74) *Attorney, Agent, or Firm* — Lane Powell PC

(57) ABSTRACT

A system and method for improving network coverage is discussed herein. The system and method can improve network coverage based on lack of coverage key performance indicators generated by disconnection data when user equipment (UE) disconnects from and reconnects to a wireless network. The system determines if the disconnection is associated with a lack of coverage by the wireless network or some other reason. When the disconnection is due to lack of coverage, once the UE reconnects to the wireless network, lack of coverage data associated with the lack of coverage can be used to generate key performance indicators which can be used to improve network coverage. For example, an additional network site can be added to the network, a network site operating parameter can be adjusted, or the like.

20 Claims, 4 Drawing Sheets

TELECOMMUNICATIONS NETWORK COVERAGE

BACKGROUND

In the second quarter of 2019, approximately 80% of customers reported losing network services due to lack of coverage of a telecommunications network. Some users may experience issues with their use of the network services throughout the day, such as dropped calls, connectivity issues, or unacceptable data speeds. Other users may experience issues with their use of the network services at specific times of the day, such in a specific location during a commute to and from work.

The variance in experiences, or the general lack of coverage, with the telecommunications network can be due to how individual network sites are configured, how a device is produced, how a user interacts with or uses the device, or how the telecommunications network lacks the necessary number of network sites. For example, each network site is configured to be optimized for an operator of the telecommunications network, rather than the users of the network site.

What is needed is a telecommunications network having improved network coverage. What is further needed is a telecommunication network to more efficiently determine the lack of coverage.

DETAILED DESCRIPTION

A system and method for improving network coverage based on lack of coverage and a cause code received by the system upon disconnection of user equipment from a network site is discussed herein. Upon disconnection of the user equipment (UE) from the wireless network, the wireless network determines if the disconnection is due to a lack of coverage by the wireless network or some other reason (e.g., the UE battery has died, the UE has been powered off, the UE has connected to WiFi, or the like). When the UE detaches for a known reason (e.g., the UE battery has died, the UE has been powered off, the UE has connected to WiFi, or the like), a cause code is transmitted to a mobility management entity (MME). The MME, having received the cause code for the known reason, does not page the UE. Furthermore, even if there are unsuccessful paging notifications, the cause code can be used to exclude the detachment as being due to lack of coverage.

When 3 unsuccessful paging notifications (i.e., no response, pages not received by UE, etc.) occur and no cause code is associated with the disconnection, the UE is implicitly detached from the wireless network and the disconnection is determined to be due to lack of coverage. Once the UE reconnects to the wireless network, lack of coverage data associated with the lack of coverage (e.g., time of day of disconnection and the time of day of reconnection, the network site or location of disconnection and the network site or location of reconnection, the like, or combinations thereof) can be used to generate key performance indicators which can be used to improve network coverage. For example, an additional network site can be added to the network (i.e., installed, acquired rights to use, the like, or combinations or multiples thereof), a network site operating parameter can be adjusted, or the like.

Figure 1:
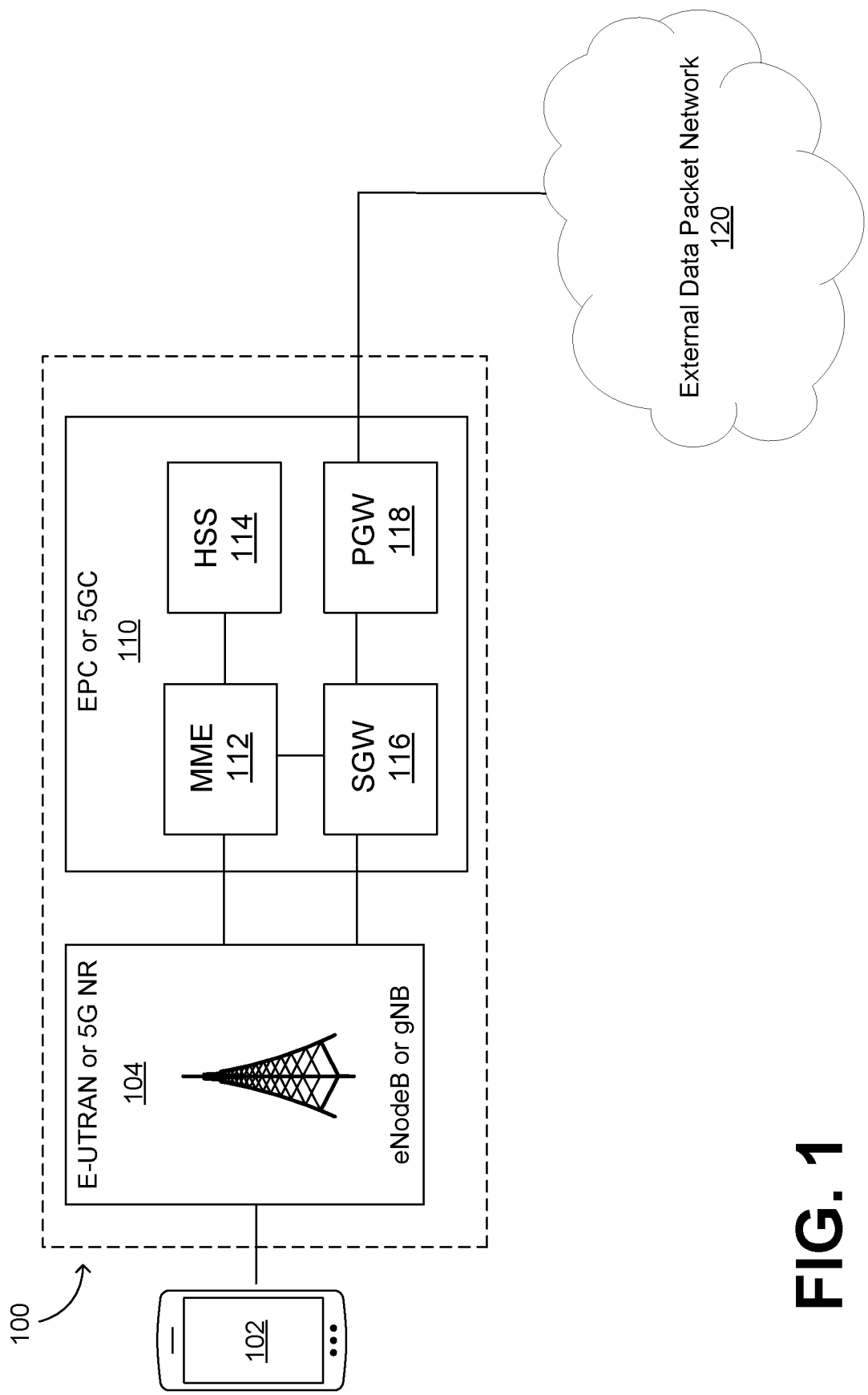
FIG. 1 illustrates an example network.

FIG. 1 shows a system including a telecommunications network 100. The telecommunications network 100 includes an access network (e.g., E-UTRAN; VoLTE; 5G NR; VoNR) 104 which includes a network site (e.g., eNodeB or gNB). The access network 104 transmits data, including data packets, between user equipment (UE) 102 and an external data packet network 120, such as through a data core 110. The network site controls the UE 102 within a given cell of the telecommunications network 100. For example, the network site sends and receives radio transmission(s) to the UE 102 using analogue and digital signal processing functions of an access network air interface. The network site also controls low-level operations of the UE 102 via signaling messages, such as handover commands.

The network site includes a UE communication module programmed to communicate with the UE 102 (i.e., transmit a signal or data). The UE communication module can be an interface, such as a UU or e-Uu interface. The network site also includes a data core communication module programmed to communicate (i.e., transmit a signal or data) with the data core 110. The data core communication module can be an interface, such as a S1, GTP, or NG interface.

The UE 102 is any device used by an end-user for communication or data transmission purposes, including, without limitation, a mobile phone, a smartphone, a tablet, a personal digital assistant, a laptop with mobile connectivity, or the like.

The data core 110 is an IP-based core network infrastructure that provides packet data services, such as to support the convergence of licensed and unlicensed radio technologies (e.g., an evolved packet core (EPC) or 5G Core). The data core 110 can be defined around various paradigms, including mobility, policy management, and security. The four elements of the data core include a home subscriber server (HSS) 114, a mobility management entity (MME) 112, a serving gateway (SGW) 116, and a packet data network gateway (PGW) 118.

The MME 112 pages and authenticates the UE 102. The MME 112 can retain location information at the tracker level for each UE 102 and selects the appropriate gateway during the initial registration process. The MME 112 can connect to the network site via a S1-MME interface and to the SGW 116 via a S11 interface.

The SGW 116 forwards and routes packets (e.g., data packets) to and from the network site and the PGW 118. The SGW 116 connects to the network site via a S1-M and to the PGW 118 via a S5/S8 interface.

The PGW 118 provides connectivity between the UE 102 and the external data packet network 120, including a public data network, an IP multimedia subsystem (IMS) core, the like, or combinations or multiples thereof. The PGW 118 can be connected to the external data packet network 120 via a SGi interface.

The HSS 114 of the data core 110, which is in communication with the MME 112 via a S6 interface, is a database that contains user-related information and subscriber-related information.

Figure 2A:
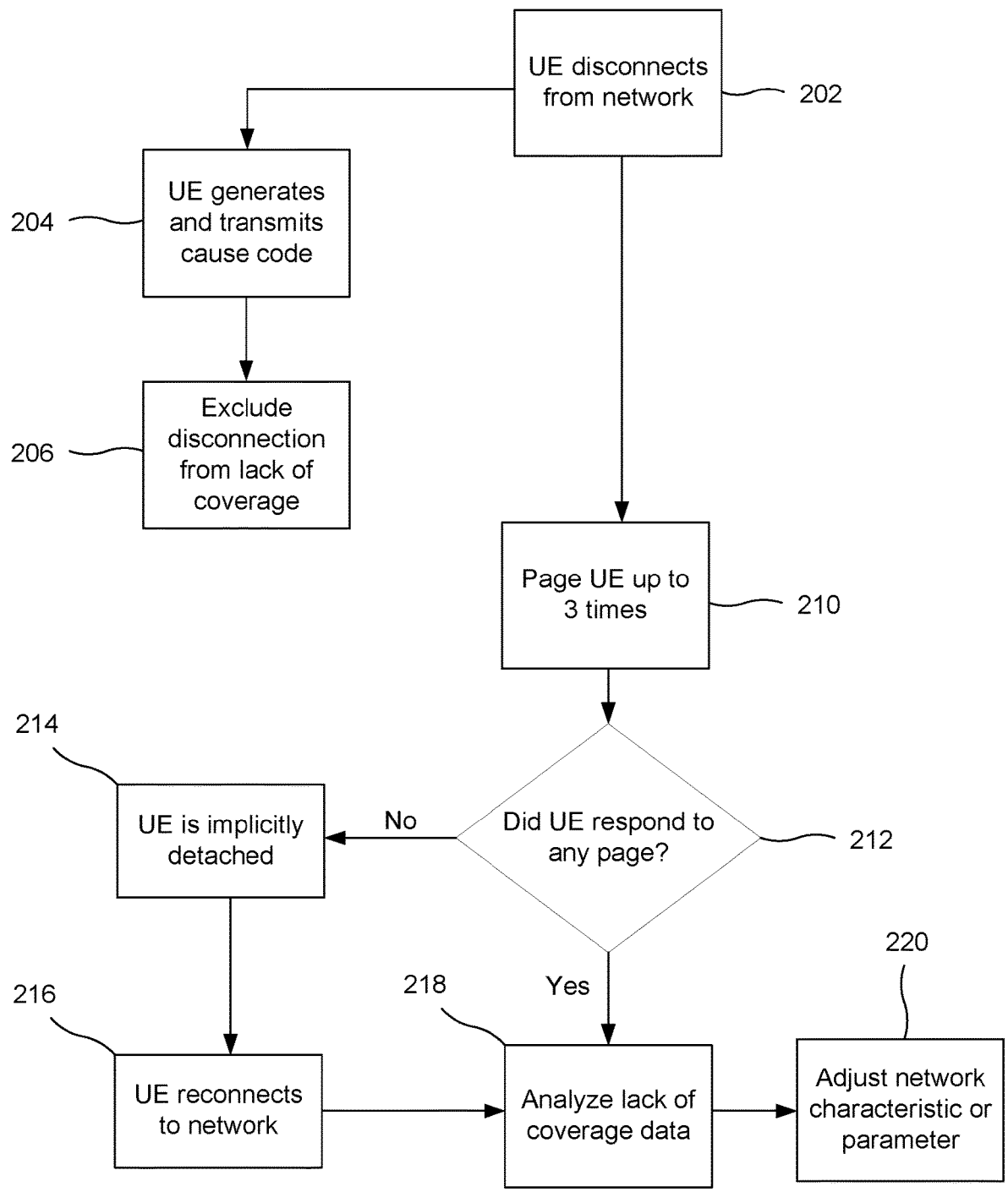
FIG. 2A illustrates a flowchart for an example process for determining lack of coverage.
Figure 2B:
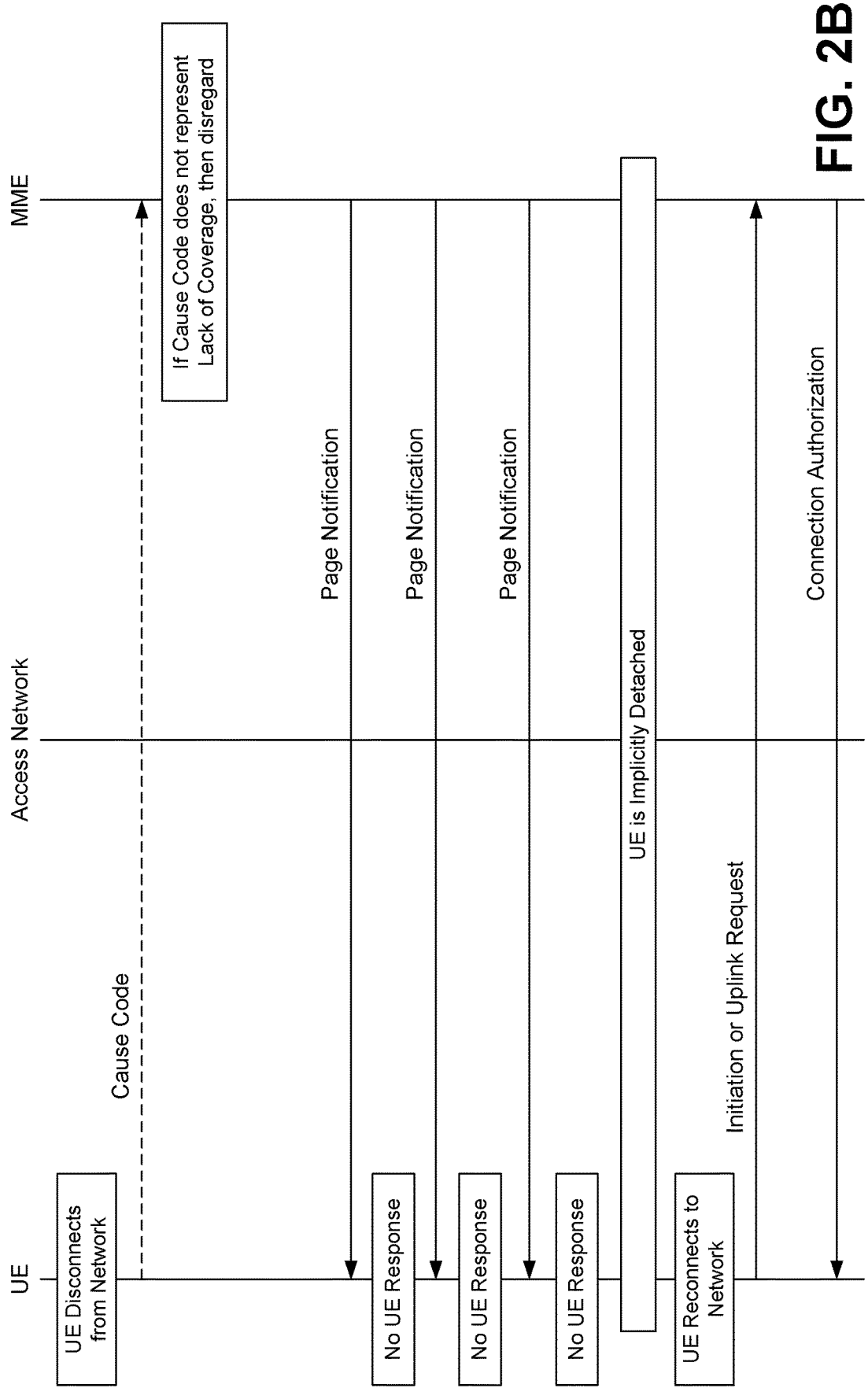
FIG. 2B illustrates an example process for communicating between two entities.

FIG. 2A shows a flowchart for determining lack of coverage and adjusting a characteristic or parameter of a network based on data associated with the lack of coverage. FIG. 2B shows a process for communicating between the UE 102 and the MME 112.

At 202, the UE disconnects from the network. The disconnection can be caused for any reason, including lack of coverage, the UE battery has died, the UE has been powered off, the UE has connected to WiFi, or the like.

At 204, when the UE detaches for a known reason (e.g., the UE battery has died, the UE has been powered off, the UE has connected to WiFi, or the like), the UE generates and transmits a cause code to the MME. The cause code represents the reason for the detachment. At 206, the cause code can be used to exclude the detachment as being due to lack of coverage. In one example, the MME, having received the cause code for the known reason, does not page the UE. In another example, even if there are unsuccessful paging notifications, the cause code excludes the detachment from being considered "lack of coverage."

At 210, the MME transmits up to three paging notifications. Any suitable number of paging notifications could be transmitted by default or the number could be adjustable or set manually.

At 212, a determination is made as to whether or not the UE responded to any paging notification. In one example, the MME transmits a first paging notification to the disconnected UE. If the UE does not respond, the MME transmits a second paging notification to the UE. If the UE does not respond, the MME transmits a third paging notification to the UE. If the UE does not respond, the UE is implicitly detached from the network, such as at 214. When the MME designates the UE disconnection as an implicit detachment, the MME initiates detachment of the UE without a detachment notification included because of the inability of the MME to communicate with the UE. At 216, the UE reconnects to the network and sends an initialization or uplink request to the MME. The MME responds by transmitting a connection authorization to the UE.

Figure 3:
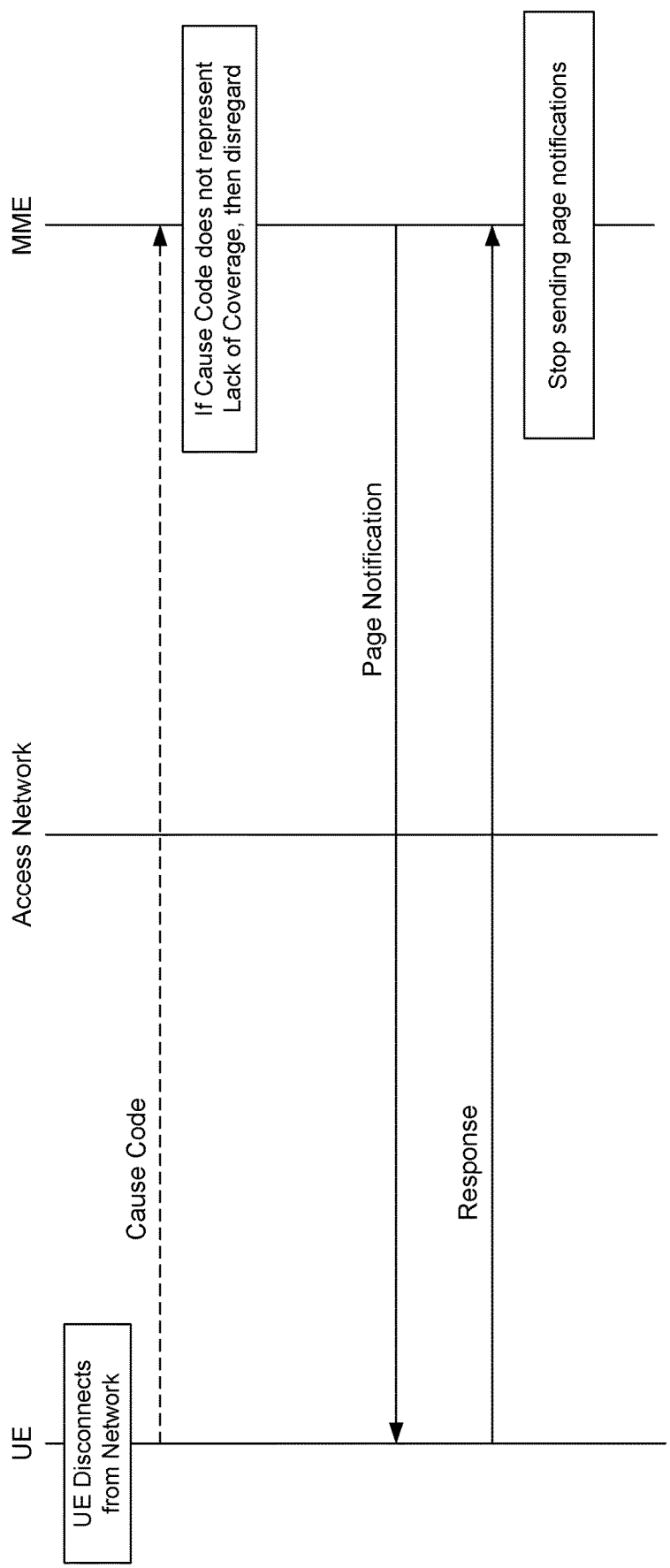
FIG. 3 illustrates an example process for communicating between two entities.

In another example, as shown in FIG. 3, the UE responds to one of the paging notifications and the MME does not send any additional paging notifications.

Lack of coverage data, such as data or information associated with the disconnection and reconnection of a UE from a network site, is transmitted to a data storage device or service of service provider, such as a server, a computer, a cloud, or the like. For example, the lack of coverage data can include the time of day of disconnection and the time of day of reconnection, the network site or location of disconnection and the network site or location of reconnection, the like, or combinations thereof. At 218, the lack of coverage data is analyzed. A key performance indicator (KPI), or disconnection factor, can be determined by analyzing the lack of coverage data. The KPI is a measurable value or attribute to evaluate or demonstrate the wireless coverage, or lack thereof, of a service provider. The KPI can include a duration of disconnection, a location of disconnection, an average or median duration of disconnection (such as with multiple UEs disconnecting), the like, or combinations or multiples thereof.

In one example, when the UE responds to one of the paging notifications, the lack of coverage data is not transmitted to the provider or is transmitted to the provider but is not included in deriving a KPI.

In another example, when the UE responds to one of the paging notifications, the lack of coverage data is transmitted to the provider and is given a lower weight or coefficient value, such as within an analysis algorithm, when analyzing the lack of coverage data.

The KPI can be a low-level KPI (i.e., focusing on more specific aspects of the lack of coverage) or a high-level KPI (i.e., focusing on more general aspects of the lack of coverage). For example, the low-level KPI can be associated with a customer (e.g., a customer action or use of a device can affect a network signal or network coverage), a device (e.g., processor or antenna of a specific model or manufacturer can affect a received signal), or the like. As another example, high-level KPI can be associated with a cell sector, a market, a region, national coverage, or the like.

The KPI level can also determine how often the lack of coverage data is analyzed. For example, a low-level KPI can be analyzed daily or weekly. As another example, a high-level KPI can be analyzed hourly or daily.

At 220, a network characteristic or parameter is adjusted based on the KPI, including the type of KPI, the value or attribute, or both. For example, an additional network site can be added to a location where disconnections are high. As another example, a network site operating parameter can be adjusted to increase a radius of network coverage from a network site. The network site operating parameters can include, for example, tilting, transmission power, padding, retransmission, and the like, or combinations or multiple thereof. Tilting is the mechanical or electronic adjustment of an angle of an antenna of the network site. Transmission power (in decibels, or dB) is the power generated or produced by the network site at an output. Padding is the space between data sent to the UE. Retransmission is the number of times data is sent to ensure the UE receives the data.

To adjust a network site operating parameter, an instruction or signal is generated to alter or adjust the one or more operating parameters of the network site to be altered or adjusted. The instruction can be generated by a module or processor connected to or part of an external data packet network. The instruction or signal can include an amount of change for the network site operating parameter to be altered or adjusted. The amount of change can be calculated based on a KPI value or pre-determined based on a KPI attribute. For example, a KPI value of +2 may change an operating parameter by 2 decibels or degrees. As another example, a KPI attribute of "poor" may change an operating parameter by 10-15%, whereas a KPI attribute of "good" does not change an operating parameter. A module or processor of the network site adjusts or alters the network site operating parameter based on the received instruction.

For example, when the network site operating parameter to be adjusted or altered is tilting, the network site module or processor can send a signal to a motor or actuator connected to an antenna to mechanically tilt the antenna (e.g., up, down, left right, rotate about one or more axes, the like, or combinations or multiples thereof) or electronically tilt the antenna (e.g., change direction of signal being sent to or received from the UE or another device or network component). The antenna, in response to the instruction or signal, then physically tilts accordingly. As another example, when the network site operating parameter to be adjusted or altered is power transmission, the network site module or processor can send a signal to a power source of an antenna or an antenna output to change the power transmission. The power source can increase or decrease (such as by increasing or decreasing voltage or current, where appropriate) to correspondingly increase or decrease the power transmission at the output. As yet another example, when the network site operating parameter to be adjusted or altered is padding or retransmission, the network site module or processor can include an instruction to a processor to change the padding or change the retransmission to the UE. The processor can then change padding or retransmission settings.

The additional network site can be added manually, such as by construction, or can be added by acquiring rights to use an already-existing network site.

Embodiments of the invention can include a non-transitory computer readable medium which can store instructions for performing the above-described methods and any steps thereof, including any combinations of the same. For example, the non-transitory computer readable medium can store instructions for execution by one or more processors or similar devices.

Further embodiments of the present invention can also include the one or more user equipment(s), network sites, backend network, or servers which read out and execute computer executable instructions, such as a non-transitory computer-readable medium, recorded or stored on a storage medium (which may be the same as or different than the storage medium for storing images or files, as discussed above), to perform the functions of any embodiment. The user equipment or server may include one or more of a central processing unit (CPU), micro processing unit (MPU), or other circuitry, such as a processor, and may include a network of separate user equipment or servers or separate computer processors. The computer executable instructions may be provided to the user equipment, network node, or server, for example, from a network or the storage medium.

Though certain elements, aspects, components or the like are described in relation to one embodiment or example of a telecommunications network, those elements, aspects, components or the like can be including with any other telecommunications network, such as when it desirous or advantageous to do so.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

What is claimed is:

1. A system for improving wireless network lack of coverage, comprising:
a processor configured to:
transmit a paging notification to a user equipment (UE),
determine a disconnection of the UE from a wireless network for an unknown reason due to a lack of response by the UE to the paging notification,
detect a reconnection of the UE to the wireless network,
measure a characteristic or parameter of the unknown reason associated with the disconnection from and reconnection to the wireless network by the UE, and
determine a disconnection factor associated with the unknown reason for disconnection from the wireless network based on the characteristic or parameter of the unknown reason; and
an output configured to generate a signal or instruction to adjust a characteristic or parameter of the wireless network to improve coverage of the wireless network based on the disconnection factor.

2. The system of claim 1, wherein the disconnection factor comprises duration of lack of coverage, location of lack of coverage, median duration of lack of coverage, average duration of lack of coverage, or combinations or multiples thereof.

3. The system of claim 1, wherein the characteristic or parameter of the unknown reason comprises time of day of disconnection and the time of day of reconnection, the network site or location of disconnection and the network site or location of reconnection, or both.

4. The system of claim 1, wherein the signal or instruction causes a network site receiving the signal or instruction to adjust a network site operating parameter.

5. The system of claim 4, wherein the network site operating parameter comprises tilting, transmission power, padding, retransmission, or combinations or multiple thereof.

6. The system of claim 1, wherein the signal or instruction comprises a notification to add a network site to the telecommunications network.

7. The system of claim 1, wherein the processor is further configured receive a cause code from the UE upon disconnection of the UE from the wireless network based on a known reason.

8. The system of claim 7, wherein the known reason for disconnection comprises that the UE battery has died, that the UE has been powered off, or that the UE has connected to WiFi.

9. The system of claim 1, wherein the processor is further configured to implicitly detach the UE from the wireless network when the UE does not respond to any of three paging notifications.

10. The system of claim 1, wherein detection of the reconnection of the UE to the wireless network comprises receiving an initialization or uplink request generated by the UE.

11. A method for improving wireless network lack of coverage, the method comprising:
paging a user equipment (UE);
determining a disconnection of the UE from a wireless network for an unknown reason due to a lack of response by the UE to the paging notification,
detecting a reconnection of the UE to the wireless network;
measuring a characteristic or parameter of the unknown reason associated with the disconnection from and reconnection to the wireless network by the UE;
determining a disconnection factor associated with the unknown reason for disconnection from the wireless network based on the characteristic or parameter of the unknown reason; and
adjusting a characteristic or parameter of the wireless network to improve coverage of the wireless network based on the disconnection factor.

12. The method of claim 11, wherein the disconnection factor comprises duration of lack of coverage, location of lack of coverage, median duration of lack of coverage, average duration of lack of coverage, or combinations or multiples thereof.

13. The method of claim 11, wherein the characteristic or parameter of the unknown reason comprises time of day of disconnection and the time of day of reconnection, the network site or location of disconnection and the network site or location of reconnection, or both.

14. The method of claim 11, wherein the characteristic or parameter of the wireless network is a network site operating parameter.

15. The method of claim 14, wherein the network site operating parameter comprises tilting, transmission power, padding, retransmission, or combinations or multiple thereof.

16. The method of claim 11, wherein the characteristic or parameter of the wireless network is a number of network sites of the telecommunications network.

17. The method of claim 11, further comprising receiving a cause code from the UE upon disconnection of the UE from the wireless network based on a known reason.

18. The method of claim 17, wherein the known reason for disconnection comprises that the UE battery has died, that the UE has been powered off, or that the UE has connected to WiFi.

19. The method of claim 11, further comprising implicitly detaching the UE from the wireless network when the UE does not respond to any of the three pages.

20. The method of claim 11, wherein the reconnection of the UE to the wireless network comprises receiving an initialization or uplink request generated by the UE.

* * * * *